(Model.)
J. B. MONTAGUE & J. T. BOOKER.
KNOB ROSE.
No. 245,969.  Patented Aug. 23, 1881.
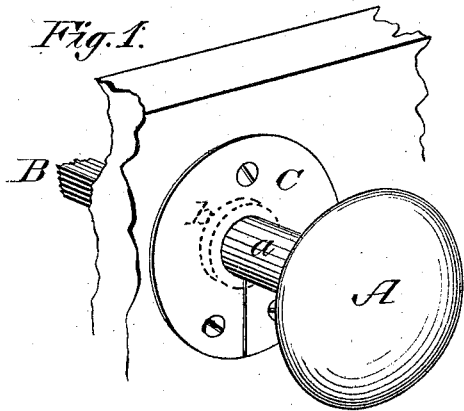
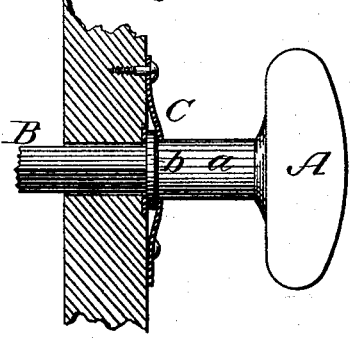
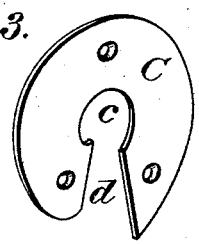
Attest:
Walter S. Dodge.
Geo. T. Byington.
Inventors:
John B. Montague,
James T. Booker,
by Dodge & Son,
Attys.

UNITED STATES PATENT OFFICE.

JOHN B. MONTAGUE AND JAMES T. BOOKER, OF FRANKLIN, KENTUCKY.

KNOB-ROSE.

SPECIFICATION forming part of Letters Patent No. 245,969, dated August 23, 1881.

Application filed June 9, 1881. (Model.)

*To all whom it may concern:*

Be it known that we, JOHN B. MONTAGUE and JAMES T. BOOKER, of Franklin, in the county of Simpson and State of Kentucky, have invented certain Improvements in Knob Attachments, of which the following is a specification.

Our invention relates to knob-fastenings; and it consists in a rosette provided with a central opening and with a narrow slit extending therefrom to the outer edge, the rosette being intended for use in connection with a shouldered shank or spindle, and made of elastic or pliable material, whereby it is adapted to be sprung or bent open to straddle the shank, and subsequently restored to its original shape.

In the accompanying drawings, Figure 1 represents a perspective view of a knob secured in place by our improved rosette or plate; Fig. 2, a vertical section through the rosette and the wood-work to which the knob is applied; Fig. 3, a perspective view of the rosette or plate previous to its application.

The object of our invention is to provide a simple, cheap, and efficient means of securing knobs in place, and to render the same easy of application.

To this end the invention consists in forming the knob-shank or the spindle to which the same is applied with a shoulder, and providing a plate or rosette which may be sprung or bent open to pass around or straddle the shank and be subsequently restored to its original form, said rosette being secured to the wood-work or article to which the knob is applied and arranged to bear against the shoulder of the shank. This will be more readily understood by referring to the drawings, in which—

A represents a knob, the shank $a$ of which is formed or provided with a flange or shoulder, $b$, at its inner end; and B the spindle to which the knob is applied. The spindle extends through or into an opening in the wood-work D or other body to which it is applied, said opening being of proper size and form to permit the spindle to rotate freely, if so desired, as usual.

C represents the rosette or plate, which, as shown in the several figures, is formed with a central opening, $c$, to receive and closely fit the shank $a$, and with a slit or opening, $d$, extending from the central opening to the outer edge of the plate or rosette, as shown. The plate or rosette may be made of thin sheet metal having considerable elasticity or pliability, or of a softer metal or alloy possessing in a high degree the latter quality, the slit or opening $d$ being merely a narrow dividing-line between the two opposing edges, as shown. Thus made, the edges may be sprung or bent apart, as shown in Fig. 3, to permit the plate or rosette to be slipped upon the shank $a$ and subsequently brought together to restore the rosette to its original form.

It is apparent that the shoulder may be formed upon the spindle instead of the shank, the latter in such case being made fast to the spindle.

The rosettes or plates may be of any suitable material and finished as desired. When formed of sheet metal the rosettes may be made to present a raised or ornamental appearance on the face by stamping them in dies or by cutting them in such form that when the two edges are drawn together a conical or sloping face shall be produced, as shown in Fig. 2.

We are aware that shouldered shanks have heretofore been held in place by rosettes or plates of different forms, and we do not claim such arrangement, broadly; but, Having described our invention, what we claim is—

1. A rosette or plate for securing knobs in place, provided with a central opening to receive the knob shank, and with a slit or opening extending therefrom to the outer edge of the plate or rosette, and adapted to be sprung or bent open to straddle the shank.

2. In combination with a shouldered shank or spindle, a rosette or plate provided with a central opening to receive the shank and with a slit or opening extending therefrom to the outer edge of the plate or rosette and adapted to be sprung or bent open to straddle the shank, substantially as set forth.

JOHN B. MONTAGUE.
JAMES T. BOOKER.

Witnesses:
O. M. McCLANAHAN,
SAML. N. FORLINE,